F. KEARNEY & L. F. TRONSON.

Spark-Arresters for Locomotives.

No. 5,184.

Reissued Dec. 10, 1872.

Witnesses:

D. H. Crawford

Edward Colloer

Inventors:

Francis Kearney

Luke F. Tronson

AM. PHOTO LITHOGRAPHIC CO. N.Y. (OSBORNE'S PROCESS.)

UNITED STATES PATENT OFFICE.

FRANCIS KEARNEY AND LUKE F. TRONSON, OF NEWARK, NEW JERSEY.

IMPROVEMENT IN SPARK-ARRESTERS FOR LOCOMOTIVES.

Specification forming part of Letters Patent No. 113,528, dated April 11, 1871; reissue No. 5,181, dated December 10, 1872.

*To all whom it may concern:*

Be it known that we, FRANCIS KEARNEY and LUKE F. TRONSON, both of the city of Newark, county of Essex, and State of New Jersey, have invented certain new and useful Improvements in Spark-Arresters for Locomotives; and hereby declare the following to be a full and clear description of the same, reference being had to the accompanying drawing, in which—

Figure 1:
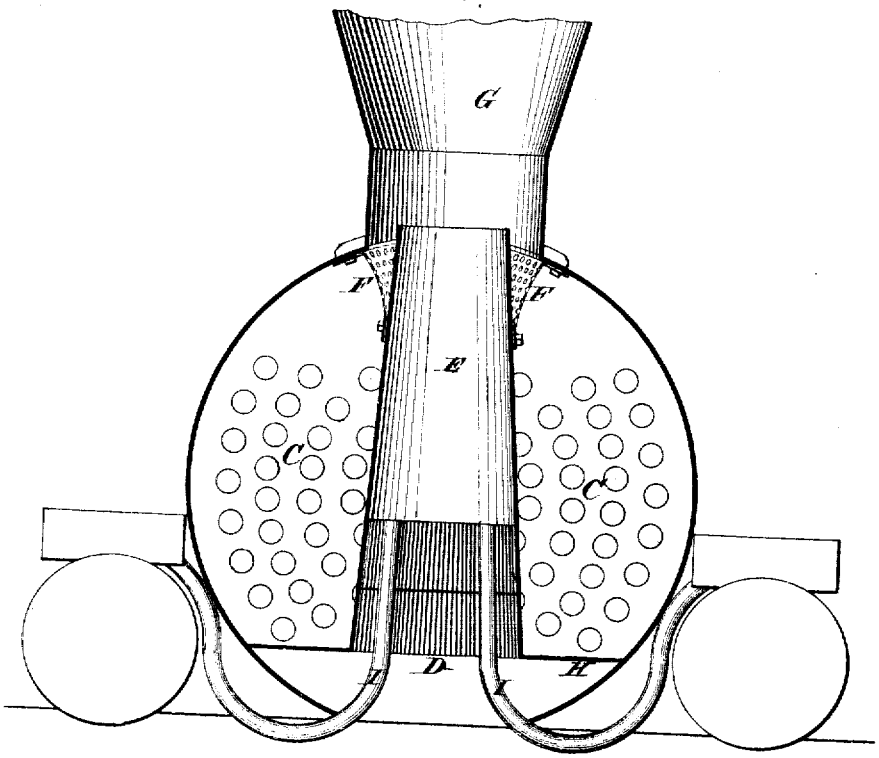
Figure 2:
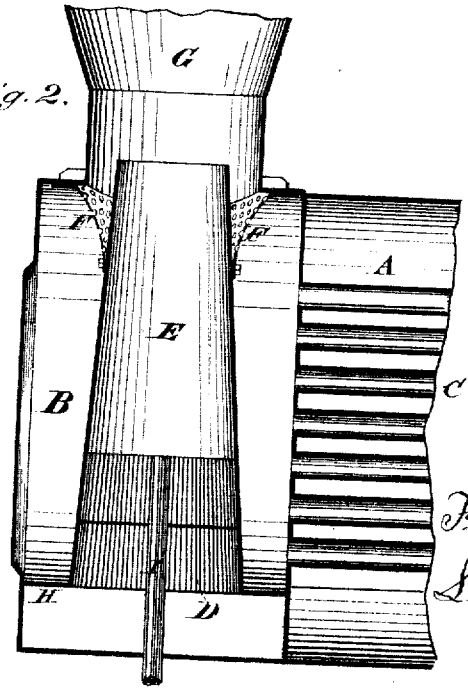

Figure 1 is a vertical cross-section of the smoke-box of a locomotive with our improvements attached, and Fig. 2 is a vertical longitudinal section of the same, and a portion of the boiler.

The letters of reference indicate the same parts in both figures.

A represents a portion of the boiler of a locomotive. B is a space, commonly called the smoke-box. C C are the flues at the point where they enter the smoke-box; E is a pipe extending from within the base of the smoke-stack down into the smoke-box, and commonly termed a "petticoat-pipe." D is a grating placed at the lower part of the petticoat-pipe to prevent any cinders or sparks passing into the same. F is a netting or grating placed around the top of the petticoat-pipe so as to cover the annular opening caused by the difference in size of the upper part of the petticoat-pipe and the bottom of the smoke-stack G. H is a piece of boiler-plate or sheet-iron placed at the bottom of the smoke-box in order to provide a flat surface for the grate D to rest upon, and is provided with holes, through which the exhaust-pipes I I pass.

Our improvements relate to providing locomotives with a suitable device for preventing live coals, cinders, sparks, and like substances, which may leave the furnace, from passing into or out of the smoke-stack, and to retain them in the smoke-box, from which place they may be removed at pleasure.

It has heretofore been the practice to cover the tops of smoke-stacks of locomotives with a wire netting or grating for the purpose of preventing the escape of sparks and cinders; and, in some cases, an inverted metal cone is also placed in the center of such netting or grating to receive and break the force of the cinders as they are thrown against it. In all of these contrivances the cinders receive so much force from the exhausting steam while on their way up the petticoat-pipe and smoke-stack that they very soon destroy the netting or grating placed at the top of the smoke-stack, and, where a cone or other device is used to turn the cinders downward and partially protect the grating the gases are also retarded in their escape.

In order to overcome these difficulties, we place a grating, F, at or near the lower end of the petticoat-pipe E so as to surround the exhaust-pipes I I and prevent any cinders or sparks entering the pipe E, while allowing free passage for the smoke and gases. We also place a grating or netting, F, around the top of the petticoat-pipe to cover the aperture left between it and the smoke-stack in order to arrest any sparks or cinders that may be drawn to that point.

We construct the grating D with straight vertical bars of iron, placed at small distances apart, but these spaces should be such, in the aggregate, as will be sufficient for the draft and escape of the smoke, on kindling the fire, or when the engine is not in motion.

By this arrangement nothing but smoke and gas are allowed to pass the netting F, and no coals or dangerous sparks can pass out of the smoke-box into the petticoat-pipe, they being arrested by the grating F before having received any very great impulse by reason of the exhaust-pipes. The strong draft up the pipe E and smoke-stack brings the greatest portion of the cinders and sparks to the grating D, against which they strike and fall harmless to the bottom of the smoke-box, while the smoke and gases have free and uninterrupted egress through the petticoat-pipe and smoke-stack, they being perfectly clear; and the gratings D and F are not liable to be injured by the cinders striking against them, as they are arrested before having obtained the force they would have if allowed to pass up into the smoke-stack.

What we claim as our invention, and desire to secure by Letters Patent, is—

1. The grating D with vertical bars placed at the foot of the spark or petticoat pipe E, in the manner and for the purpose substantially as described.

2. The combination of the grating D with the netting F, in the manner and for the purpose substantially as described.

FRANCIS KEARNEY.
LUKE F. TRONSON.

Witnesses:
MUNSON G. DOREMUS,
A. B. MALCOMSON, Jr.

It is hereby certified that in Reissued Letters Patent No. 5,184, granted December 10, 1872, to Francis Kearney and Luke F. Tronson, for an improvement in "Spark Arresters for Locomotives," the reference letter in lines 62 and 82 of the printed specification was inadvertently printed "F" instead of "D;" and that the specification should be read with this correction to make the same conform with the files and records of the case in the Patent Office.

Signed, countersigned, and sealed this 20th day of March, A. D. 1883.

[SEAL.]

M. L. JOSLYN,
*Acting Secretary of the Interior.*

Countersigned:

E. M. MARBLE,
*Commissioner of Patents.*